Patented Apr. 8, 1930

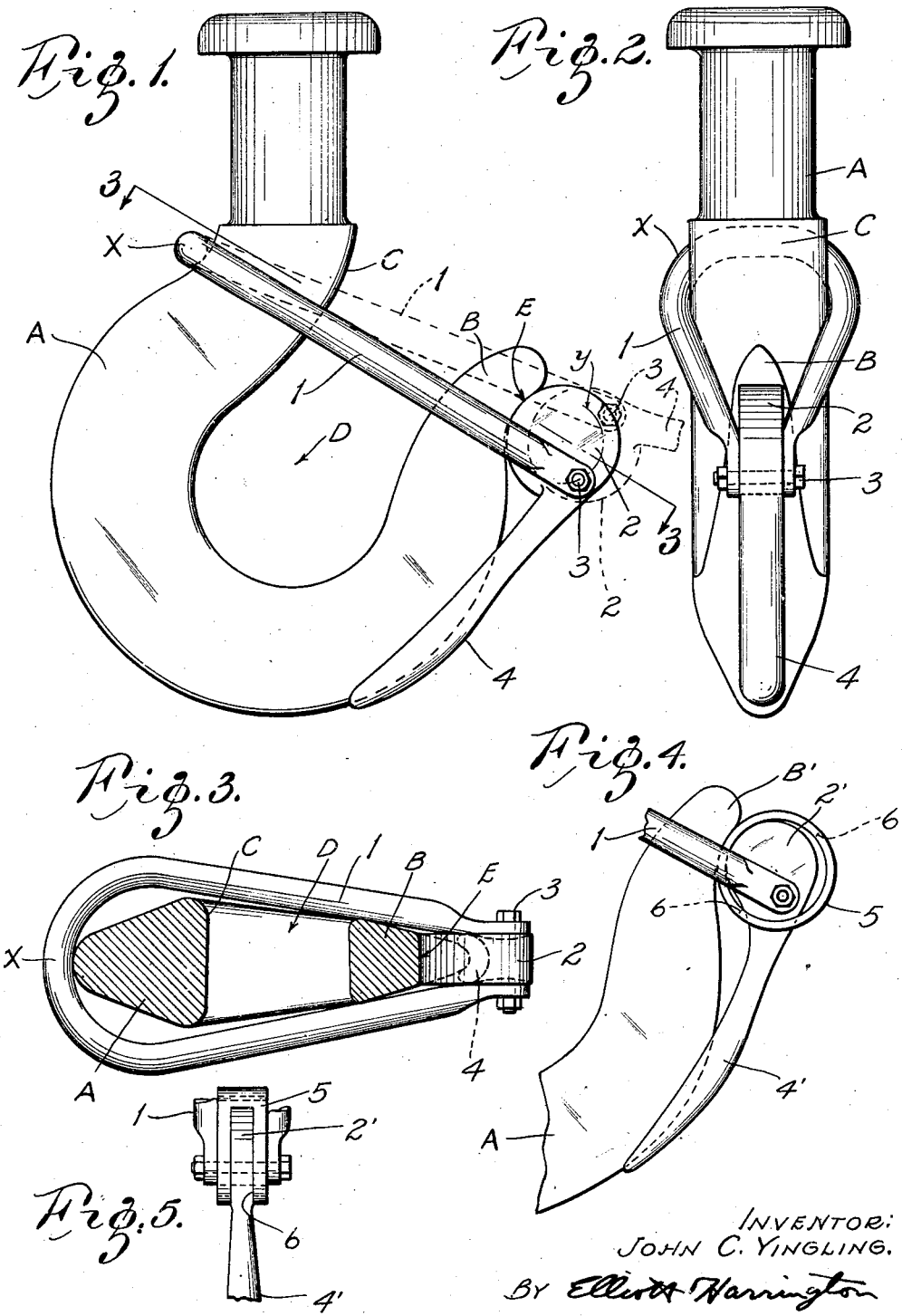

1,753,326

UNITED STATES PATENT OFFICE

JOHN C. YINGLING, OF BELLEVILLE, ILLINOIS

SAFETY GUARD FOR HOOKS AND THE LIKE

Application filed December 23, 1927. Serial No. 242,062.

This invention relates generally to safety guards, and particularly to a safety guard adapted to be applied to hooks and similar supporting devices to prevent ropes, chains and other elements which engage said hooks, from becoming accidentally detached therefrom. The device disclosed herein is capable of various applications where hooks and similar supporting elements are employed, such as on cranes, tackle-blocks, automobile trucks, tug boats, air-ship rigging, etc., and especially where the element attached to the hook or other supporting device is subjected to intermittent loads or where accidental unhooking of the element attached to the hook would endanger life and property, such as in connection with construction work in crowded areas and in logging, oil-field operations, etc.

Another object of the invention is to provide a hook or similar supporting element with additional strength by adding to same a removable reinforcing member which is extended across the opening between the jaws of the hook or other supporting device and which will not interfere with the operating efficiency of said hook or other supporting device.

Still another object of the invention is to provide a simple safety guard which locks in position against forces applied from within the throat of the hook or other supporting device and which may be applied to standard hooks with very little, if any, work in preparing the hook to receive the safety guard.

Figure 1 illustrates a side elevation of a hook having my improved safety guard associated therewith;

Figure 2 illustrates an end view of the hook and safety guard shown in Fig. 1;

Figure 3 is a cross-section on line 3—3 of Fig. 1;

Figure 4 illustrates a fragment of a hook having a modified form of my invention associated therewith;

Figure 5 is an end view of the safety guard shown in Fig. 4 with a portion of the handle broken away.

In the drawing, which illustrates one embodiment merely of my invention, A designates a hook of standard construction which, as is ordinarily the case, includes jaws B and C spaced apart to provide a throat D (Fig. 1) through which the rope, chain or other element which is to engage the hook, is passed. Also, the hook A is provided with a curved face E, this likewise being common construction in connection with hooks of the type illustrated in the drawing.

1 designates a yoke which is preferably formed of spring material and is approximately U-shaped in form, said yoke being adapted to embrace the jaws B and C of the hook A, as shown clearly in Figs. 1 and 2, and when the safety guard is in its locked position, being extended across the throat D of said hook. The curved closed end of the yoke 1 contacts with the jaw C at the side thereof opposite from the side of said jaw which forms a part of the throat D, and the end portions of the side legs of said yoke at the end opposite to the closed end thereof are spaced apart, as shown in Fig. 3.

Interposed between the spaced-apart end portions of the side legs of the yoke 1 is an over-running cam 2 which may be formed of any suitable material, said cam being rotatably secured to said leg portions of said yoke by a bolt or other suitable fastening device 3 which is extended through the cam and is extended also through openings formed in the end portions of the side legs of the yoke 1, whereby said portions of said side legs are drawn into close contact with the side faces of the cam 2. The cam 2 may be circular or irregular in shape as required by the hook design, and the peripheral face of said cam is adapted to contact with the curved face E of the jaw B, said curved face providing a seat for said cam.

The point of attachment of the leg portions of the yoke to the cam, that is, the bolt 3, is so located that when the safety guard is in a locked or unlocked position, this point of attachment is closer to the end X of the yoke 1 than is said point of attachment when said safety guard is passing from the locked to the unlocked position or vice versa. In other words, when the safety guard is in a locked or unlocked position, the point of attachment between the cam and the yoke A is spaced a predetermined distance from the end X of said yoke, while as the safety guard is being moved from a locked to an unlocked position by movement of the cam 2 in contact with the seat E, the distance between said point of attachment and the end X of the yoke is increased due to the fact that the point of attachment moves on the arc of a circle, indicated by dotted line Y in Fig. 1. This increase in distance is made possible because of the resilient nature of the metal of which the yoke is formed, the curvature of the closed end portion of said yoke being reduced slightly when the elongation of the yoke takes place to permit said elongation.

In view of the foregoing, it is plain that the safety guard will remain in a locked or an unlocked position, as the case may be, until sufficient force is applied by moving the cam to cause the yoke to be elongated as described, and hence there is very little if any danger of the cam 2 being accidentally moved to lock or unlock the safety guard.

4 designates a handle which is operatively associated with the cam 2, whereby said cam may be conveniently moved, said handle being shaped to fit the contour of the hook A, as shown in Figs. 1 and 3, whereby said handle may be maintained close to said hook when the safety guard is in a locked position.

When it is desired to pass a portion of an element to be associated with a hook provided with my improved safety guard through the throat of said hook to effect engagement of said element with said hook, the handle 4 and cam 2 are moved to the positions in which same are shown in dotted lines in Fig. 1. This will permit the end of the yoke 1 which is closed by the cam 2 to be swung upwardly so that said cam will clear the upper end of the jaw B of the hook, after which the entire safety guard may be swung about the jaw C of the hook to bring the cam 2 and the adjacent portions of the safety guard on the side of the jaw C opposite to the side thereof which forms a wall of the throat D. The element to be attached to the hook may then be passed through the throat of said hook without hindrance from the safety guard, after which said safety guard may again be swung about the jaw C and be brought to a position where the upper end portion of the jaw B extends between the side legs of the yoke 1, at which time the cam 2 will be in contact with the curved seat E formed on said jaw B. The handle 3 will then be moved to the position in which it is shown in full lines in Fig. 1, thus firmly securing the safety guard in place. If the particular hook which is received by my improved safety guard is not shaped so as to provide a seat E of proper shape to receive the cam 2, such a seat may be prepared with the aid of a file which is round in cross-section.

In the form of the invention illustrated in Figs. 4 and 5, the cam 2' is mounted within a ferrule 5, which ferrule is provided with a slot 6 through which the handle 4' associated with the cam 2' extends. The operation of the form of the invention shown in Figs. 4 and 5 is the same as that of the preferred form thereof, the only difference being that the ferrule 5 contacts with the jaw B' of the hook instead of the cam as in the preferred construction.

Instead of employing a bolt 3 or other separate fastening device for the purpose of rotatably attaching the cam 2 to the yoke 1, I may bend the end portions of the side legs of the yoke 1 laterally to provide extensions which will extend into openings formed in the cam. These offset extensions will preferably be bent at an angle greater than a right angle and will be extended into openings so shaped that after they have been snapped into place, said extensions may not be accidentally displayed from said openings. When arranged as described, the cam will be capable of rotating about the offset extensions just as it does about the bolt 3, advantage being that no separate bolt or other fastening device is needed.

I claim:

1. A safety guard for hooks and the like comprising a yoke loosely mounted on a hook and arranged to embrace portions of the jaws of said hook in a manner to cause said yoke to be removably extended across the throat of the hook to prevent accidental passage through said throat of the element engaged by the hook, a seat formed on a jaw of the hook, means comprising a cam rotatably attached to an end of said yoke and arranged in contact with said seat whereby said yoke may be rigidly attached to said hook to prevent accidental displacement thereof with respect to the throat of the hook, and a handle associated with said cam to permit convenient movement thereof, said handle being shaped to correspond to the contour of a portion of the hook to permit said handle to contact closely with said hook portion.

2. A safety guard for hooks and the like comprising a yoke formed of spring material and shaped to permit slight elongation thereof when tension is applied thereto, said yoke being loosely mounted on a hook and arranged to embrace portions of the jaws of said hook in a manner to cause said yoke to be removably extended across the throat of the hook to prevent accidental passage through said throat of the element engaged by the hook, and means comprising a cam rotatably attached to an end of said yoke and arranged in contact with a portion of said hook whereby said yoke may be rigidly attached to said hook to prevent accidental displacement thereof with respect to the throat of said hook, said yoke being elongated slightly on movement of said cam from a locked to an unlocked position or vice versa.

3. A safety guard for hooks and the like comprising a yoke formed of spring material and provided with a curved portion at the closed end thereof, said yoke being loosely mounted on a hook and arranged to embrace portions of the jaws of said hook in a manner to cause said yoke to be removably extended across the throat of the hook to prevent accidental passage through said throat of the element engaged by the hook, and means comprising a cam rotatably attached to an end of said yoke and arranged in contact with a portion of said hook whereby said yoke my be rigidly attached to said hook to prevent accidental displacement thereof with respect to the throat of the hook, said yoke being capable of being elongated slightly on movement of said cam from a locked to an unlocked position or vice versa, the curvature of the curved portion thereof being reduced slightly when this elongation takes place.

4. In combination with a standard hook, a safety guard comprising a member loosely mounted on the hook so as to be freely movable in all directions with respect thereto and arranged to be removably extended across the throat of said hook to prevent accidental passage through said throat of the element engaged by the hook, and an element eccentrically connected to said member and adapted to engage a portion of the hook whereby said member may be rigidly attached to the hook to prevent displacement thereof with respect to the throat of the hook.

5. In combination with a standard hook, a safety guard comprising a yoke loosely mounted on the hook so as to be freely movable in all directions with respect thereto and arranged to embrace portions of the jaws of said hook in a manner to cause said yoke to be removably extended across the throat of the hook to prevent accidental passage through said throat of the element engaged by the hook, and means comprising a cam eccentrically attached to an end of said yoke and arranged to engage a portion of said hook, whereby said yoke may be rigidly attached to said hook to prevent displacement thereof with respect to the throat of said hook.

6. In combination with a standard hook, a safety guard comprising a yoke loosely mounted for free movement in all directions on the hook and arranged to embrace portions of the jaws of said hook in a manner to cause said yoke to be removably extended across the throat of the hook to prevent accidental passage through said throat of the element engaged by the hook, a seat formed on a jaw of the hook, and means comprising a cam eccentrically attached to an end of said yoke and arranged in contact with said seat, whereby said yoke may be rigidly attached to said hook to prevent accidental displacement thereof with respect to the throat of the hook.

In testimony whereof, I have hereunto set my hand.

JOHN C. YINGLING.